(12) United States Patent
Davies et al.

(10) Patent No.: US 6,668,646 B1
(45) Date of Patent: Dec. 30, 2003

(54) GRAVITY METER

(75) Inventors: Mark Davies, Northants (GB); Raymond Joseph Matela, Cranfield (GB); Hazel Rymer, Chesham (GB)

(73) Assignee: The Open University, Milton Keynes (GB)

(*) Notice: Subject to any disclaimer, the term of this patent is extended or adjusted under 35 U.S.C. 154(b) by 0 days.

(21) Appl. No.: 10/327,954

(22) Filed: Dec. 23, 2002

(51) Int. Cl.[7] ................................................. G01L 7/20
(52) U.S. Cl. ..................... 73/382 R; 73/383; 73/382 G; 73/65.09
(58) Field of Search ............................. 73/65.09, 65.01, 73/382 R, 383, 382 G

(56) References Cited

FOREIGN PATENT DOCUMENTS

| GB | 1 098 650 | 1/1968 |
|----|-----------|--------|
| GB | 1 219 165 | 1/1971 |

Primary Examiner—Edward Lefkowitz
Assistant Examiner—Alandra N. Ellington
(74) Attorney, Agent, or Firm—Woodcock Washburn, LLP

(57) ABSTRACT

A gravity meter comprises a casing, a vacuum tube mounted in the casing in a vibration-free manner, a sensor mechanism mounted within the vacuum tube, the sensor mechanism comprising two masses of different size acting on the respective arms of a beam balance comprising a material whose shape is arranged to change in response to changes in gravity and whose shape can be restored by the application of an electrical current thereto, and detector means arranged to provide from the restoring current an output representative of changes in gravity. The material is preferably a piezoelectric material.

5 Claims, 2 Drawing Sheets

GRAVITY METER

FIELD OF THE INVENTION

This invention relates to gravity meters, and is particularly concerned with continuously recording gravity meters.

BACKGROUND TO THE INVENTION

The concept of gravity meters has been known for some considerable time. Their object is to measure small changes in the acceleration of a mass due to gravity, known as "g". However most such meters have been expensive to manufacture and are unsuitable for long-term installation in the field.

Gravity meters are used inter alia by geophysicists, especially for monitoring volcanic activity and for oil exploration. They do not normally measure the absolute value of g but changes in its value. They can be installed at a particular site for long-term measurements, or can be taken from site to site, taking measurements at each.

SUMMARY OF THE INVENTION

It is an object of the present invention to provide a gravity meter which can be made at lower cost, which is reliable and accurate in operation, and which is portable.

The concept underlying the vertical gravity meter is that, from the definition of gravity, a mass of any given size will weigh more closer to the center of the earth than it does at a greater distance from the center. Therefore, if one has a mass at 0 meters elevation (sea level) and if one raises the mass by 1 meter to +1 meter above sea level, then the mass should have decreased in weight.

With some designs of gravity meter they may have a relatively low recording resolution. It is another object of the present invention to provide a gravity meter with a higher recording resolution.

This is achieved in accordance with the invention by the use of a material whose electrical characteristics change when it is distorted, and by using changes in its electrical characteristics upon distortion to provide a measurement of changes in "g".

In accordance with the invention there is provided a gravity meter comprising a casing, a vacuum tube mounted in the casing in a vibration-free manner, a sensor mechanism mounted within the vacuum tube, the sensor mechanism comprising two masses of different size acting on the respective arms of a beam balance comprising a material whose shape is arranged to change in response to changes in gravity and whose shape can be restored by the application of an electrical current thereto, and detector means arranged to provide from the restoring current an output representative of changes in gravity.

In a preferred embodiment the beam balance material is a piezoelectric material.

BRIEF DESCRIPTION OF THE DRAWINGS

In order that the invention may be more fully understood, two embodiments of gravity meter will now be described by way of example and with reference to the accompanying drawings. In the drawings.

DESCRIPTION OF THE PREFERRED EMBODIMENTS

Figure 1:
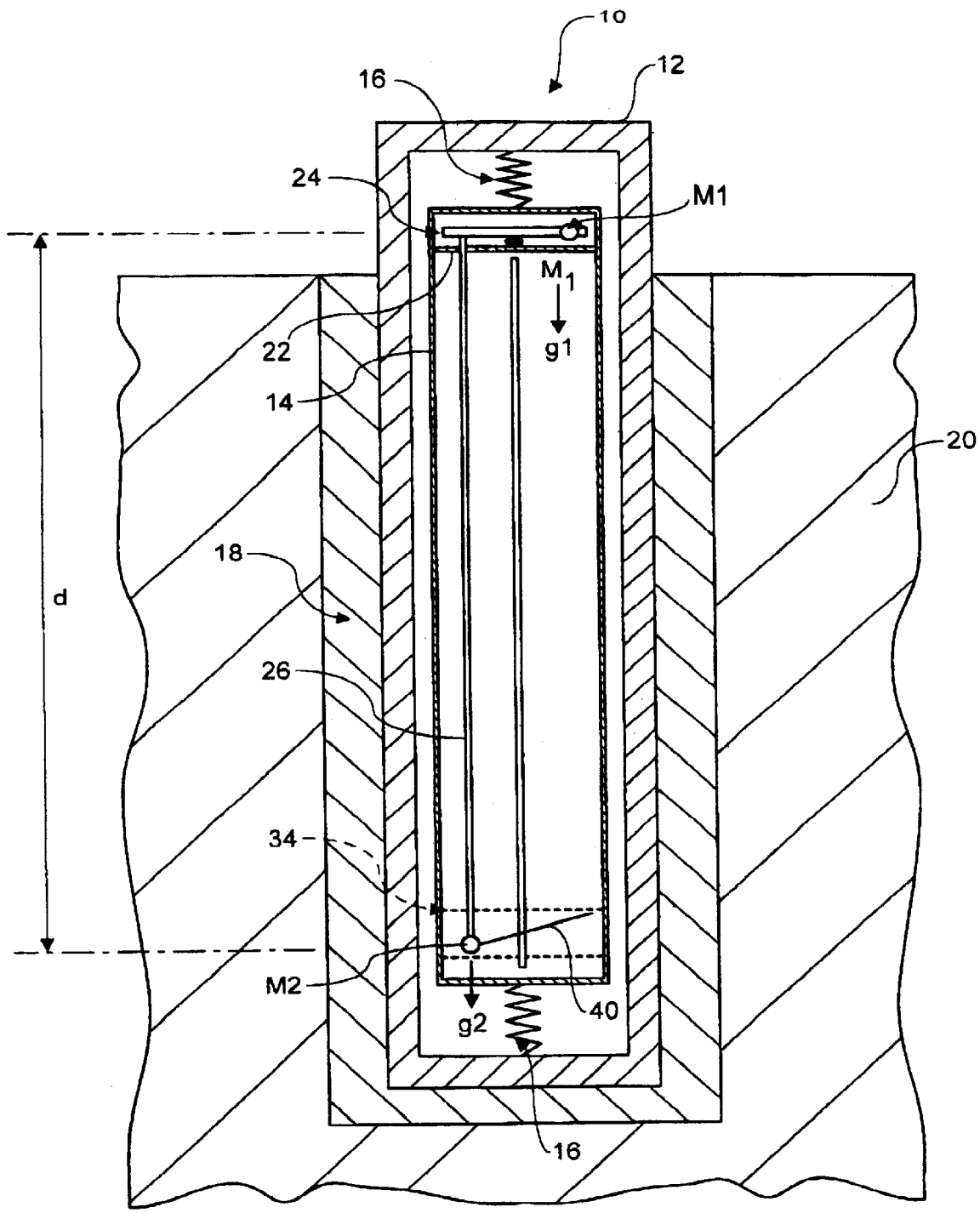
FIG. 1 is a schematic vertical section through a first embodiment of gravity meter.

Referring first to FIG. 1, there is shown a gravity meter indicated generally at 10. The meter comprises an outer casing 12 within which is suspended a vacuum tube 14. The outer casing 12 and vacuum tube 14 are both generally cylindrical in shape. The vacuum tube 14 is suspended within the outer casing by upper and lower seismic dampers 16 which extend between the upper and lower ends respectively of the vacuum tube and the adjacent internal wall of the casing. The seismic dampers 16 are vibration damping springs whose purpose is to absorb vibration so that if micro-seismicity occurs, the outer casing 2 will move up and down but the inner vacuum tube will remain stationary.

The outer casing 12 provides thermal insulation and, in use, is positioned vertically, surrounded by sand 18 in a purpose-built concrete plinth 20. The purpose of the sand 18 is to absorb vibration.

Within the vacuum tube 14 is mounted the sensor arrangement, as will now be described. Adjacent to the upper end of the vacuum tube 14 there is provided a horizontal platform 22. Within the chamber above this platform 22 is positioned a beam balance 24, the position of which is arranged to be detected optically. Adjacent to one end of the beam is positioned a mixed mass M1. Adjacent to the other end of the beam is secured the upper end of a wire filament 26 whose lower end carries a second mass M2. The two masses are of different size, with mass M1 being much smaller than mass M2. The smaller mass M1 is attached directly to the end of the beam, while the larger mass M2 is suspended by the wire filament 26 at a distance d below the other arm of the beam.

Because mass M2 is greater than mass M1, and because mass M2 is closer to the center of the earth than mass M1, the beam 24 will tilt down at the side of mass M2. The degree by which the beam tilts is registered by an optical sensor (not shown) and can be continuously recorded.

Figure 2:
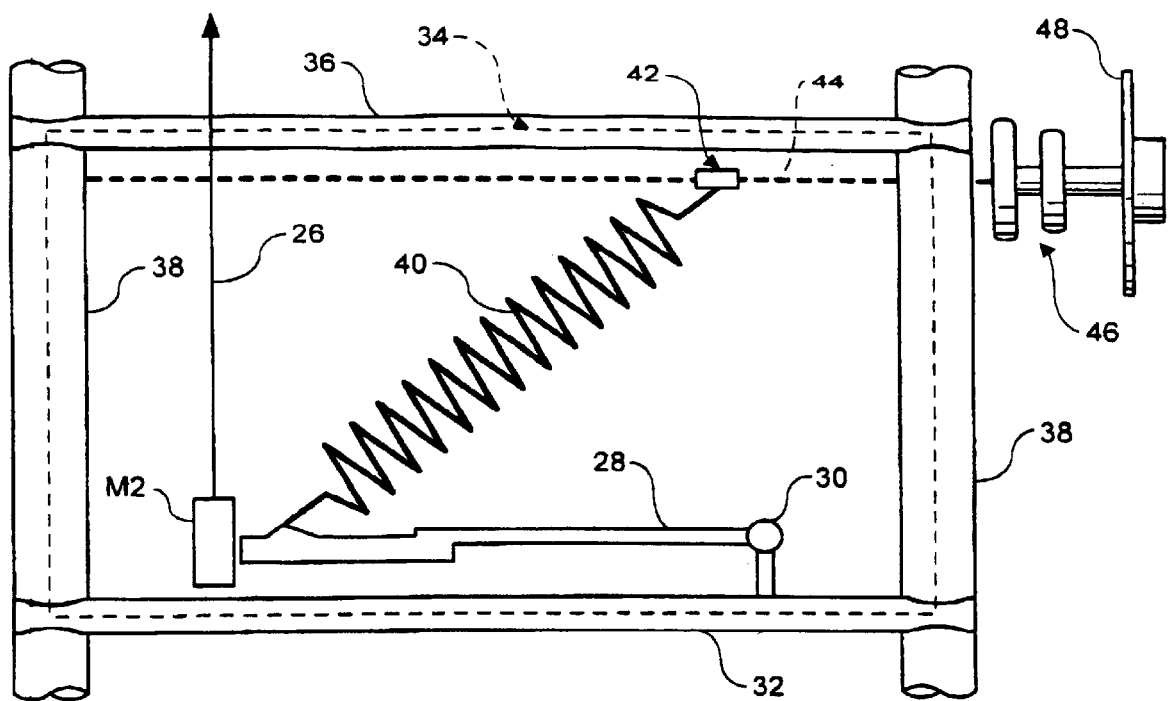
FIG. 2 is an illustration, on an enlarged scale, of the lower end of the meter of FIG. 1, to show more details of the adjusting mechanism.

On installation of the meter, the gravity differential between mass M1 and mass M2 is "nulled" or zeroed in the following way. As shown in FIG. 2, the larger mass M2 which is suspended from the wire filament 26 is attached to one end of a beam 28 which is supported at the other end by a frictionless pivot hinge 30 which is located just above a horizontal strut 32 of a sensitivity carriage which is indicated generally at 34. The sensitivity carriage 34 also comprises an upper horizontal strut 36. The two horizontal struts 32 and 36 are joined at their ends, as indicated by the rectangle of broken lines in FIG. 2, and the whole of the sensitivity carriage 34 is moveable up and down a pair of vertical support rods 38.

Adjacent to the mass M2 the beam 28 is connected to one end of a spring 40 or elastic polymer, whose other end is connected to a spring carriage 42 which is positioned above the beam pivot hinge 30. The spring carriage 42 is moveable back and forth along a horizontal micrometer screw 44. The position of the spring carriage 42 on the micrometer screw 44 is controlled through a gearbox indicated schematically at 46 and a turning dial 48. By rotating the turning dial 48, the position of the spring carriage 42 is moved. By moving the spring carriage 42 back and forth along the micrometer screw 44, the torque exerted on the beam 28 by the spring 40 can be increased or decreased. The beam 28 can thus be raised or lowered. Consequently, the weight differential which is registered via the beam balance 24 between mass M1 and mass M2 can be nulled by increasing or decreasing the spring torque. In other words, the initial tilting of the beam balance 24 can be zeroed by the use of the zeroing spring. The residual weight difference between mass M1 and mass M2 is balanced by the torque from the spring 40 so that the beam of the beam balance 24 becomes horizontal and in effect "believes" that the mass (and therefore weight) of M1 is equal to that of M2.

It is important to be able to increase or decrease the sensitivity of the instrument. The instrument may need to be made more or less sensitive depending upon the gravity anomalies which are being targeted. To achieve this, the whole of the sensitivity carriage 34 can be moved in the vertical plane so that the distance d between the two masses M1 and M2 can be increased or decreased, thereby causing the weight differential between M1 and M2 to increase or decrease respectively.

After the instrument has been installed and has been nulled or zeroed in the manner described above, a measure is first taken of the vertical gravity gradient, using a conventional gravity meter. The instrument is then calibrated against that measurement by raising and lowering the vertical gravity meter through one meter. As the instrument is raised from its zeroed or nulled position, the differential is in favour of mass M1 (as the spring 40 contracts), whereas as the instrument is lowered from its zeroed or nulled position, and the spring 40 stretches, the differential is in favour of mass M2. By taking measurements at the aforesaid raised and lowered positions one has a measure of the gravity differential per meter, which can then be used to calculate the gravity differential when operational measurements are taken.

The embodiment described above, which relies upon an optical feedback and pivot system, is suitable for a relatively low recording resolution. If a higher recording resolution is required, an alternative arrangement, as shown in FIGS. 3 and 4, can be used.

Figure 3:
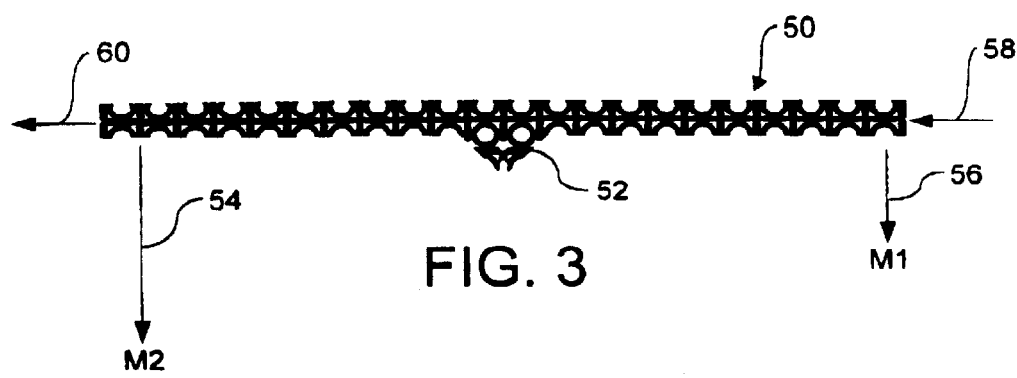
FIG. 3 is a schematic drawing of an alternative beam configuration, in accordance with the invention, using a piezoelectric crystal, in its zeroed position; and, FIG. 4 shows the beam of FIG. 3 deflected by the effect of the two masses.
Figure 4:
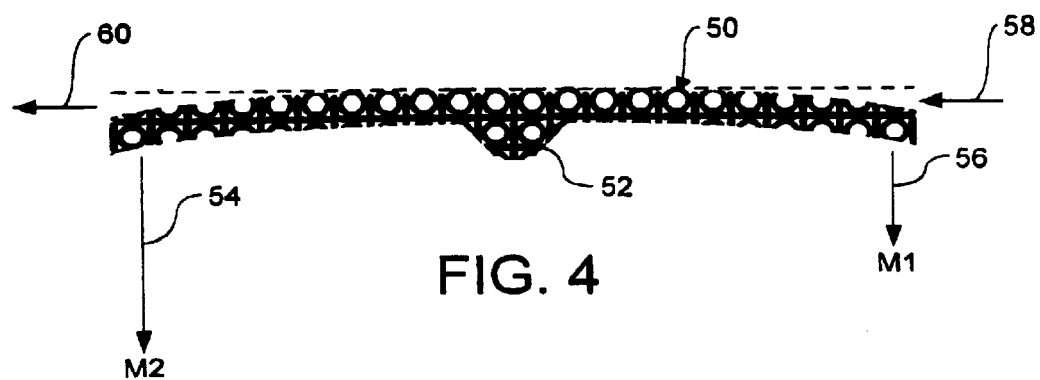

As shown in FIGS. 3 and 4, the beam balance 24 of FIGS. 1 and 2 is replaced by a piezoelectric member 50 shaped as a beam, and having a central pivot zone 52. The piezoelectric member 50 comprises a piezoelectric circuit consisting of a purpose-grown crystal. The larger mass M2 is suspended from one end of the piezoelectric member 50 by a wire filament 54 and the smaller mass M1 is suspended from the other end of the piezoelectric member 50 by a shorter wire filament 56. The structure of the rest of the gravity meter can be substantially as in the first embodiment.

Im making the instrument, the piezoelectric beam 50 is initially set horizontal. This is the zero or null position. The two masses are then added to the beam, which deflects due to the gravitational effect on the two masses, as shown in FIG. 4.

As gravity changes, so does the shape of the crystal, thus changing the resistance exhibited by the lattice. As shown in FIG. 4, a change in gravity will cause the crystal to bend, to a greater or lesser extent in dependence on the gravity change. This bending causes a change in the resistivity of the lattice, i.e. more bending produces greater resistance.

An electrical current is passed through the crystal lattice, the input being at one end of the beam as indicated at 58 and the output being at the other end of the beam as indicated at 60. The applied current counteracts the deflection due to gravity and tends to restore the beam to its horizontal, zero setting. The current is equivalent to the restoring force, which is proportional to the change in gravity (g). Therefore, by measuring the current necessary to restore the beam to its zero setting a measure can be obtained of changes in gravity. This measurement can be a one-off measurement or can be repeated at intervals to give a continuous recording.

In FIG. 3, the change in gravity has been nulled, so that the ratio of current in to current out equals 1. In FIG. 4, the change in gravity is detected by the ratio of current in to current out.

FIG. 3 shows the piezoelectric member 50 undistorted, following the initial zero setting, and FIG. 4 shows the piezoelectric member 50 distorted due to a gravity change.

Although a piezoelectric crystal has been described as constituting the beam 50, the invention is intended to include the use of any beam-shaped element which has electrical characteristics such that a change in gravity will produce a detectable proportional change in an electrical parameter of the beam.

While a preferred embodiment of the present invention has been described and illustrated, it is to be understood that further modifications thereof can be made without departing from the scope of the appended claims.

What is claimed is:

1. A gravity meter comprising a casing, a vacuum tube mounted in the casing in a vibration-free manner, a sensor mechanism mounted within the vacuum tube, the sensor mechanism comprising two masses of different size acting on the respective arms of a beam balance comprising a material whose shape is arranged to change in response to changes in gravity and whose shape can be restored by the application of an electrical current thereto, and detector means arranged to provide from the restoring current an output representative of changes in gravity.

2. A gravity meter according to claim 1, in which the material is a piezoelectric material.

3. A gravity meter according to claim 2, in which the material is a piezoelectric crystal which includes a pivot for the beam.

4. A gravity meter according to claim 1, in which the two masses are suspended from the respective arms of the beam at different heights within the vacuum tube, with the greater mass at the lower position.

5. A gravity meter according to claim 4, in which the lower mass is substantially greater than the upper mass.

\* \* \* \* \*